UNITED STATES PATENT OFFICE.

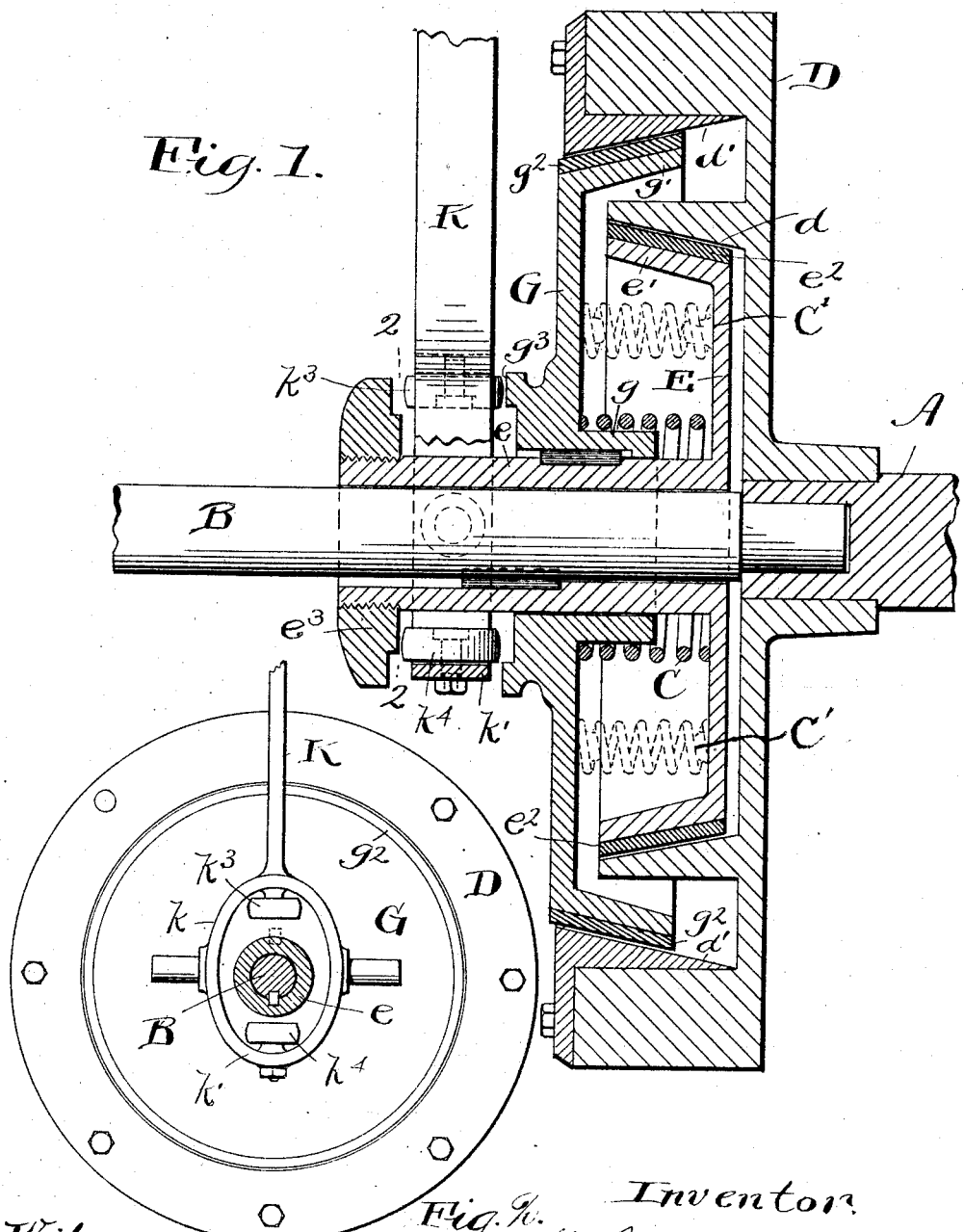

VAN ZANDT MUMFORD MOORE, OF CLEVELAND, OHIO.

FRICTION-CLUTCH.

No. 883,732.　　　　Specification of Letters Patent.　　　Patented April 7, 1908.

Application filed January 15, 1906. Serial No. 296,017.

*To all whom it may concern:*

Be it known that I, VAN ZANDT MUMFORD MOORE, a citizen of the United States, residing at Cleveland, in the county of Cuyahoga and State of Ohio, have invented a certain new and useful Improvement in Friction-Clutches, of which the following is a full, clear, and exact description, reference being had to the accompanying drawings.

The object of this invention is to provide a simple friction clutch especially, but not exclusively, adapted for use on automobiles,—said clutch having unusually large and effective friction surfaces which may be caused to engage and disengage without imparting any end thrusts to the bearings of either of the shafts to be connected thereby.

In automobile clutches especially practice has demonstrated the convenience and desirability of having the spring set the clutch, a suitable pedal or lever being provided to release the clutch. In structures of this kind with which I have been familiar the end thrust of the spring has been taken by a suitable bearing, allowing the other end of the spring to maintain the clutch set. In such an arrangement half of the force of the spring is taken up by the bearing and dissipated in useless friction, while the gripping friction between the clutch members receives only the other half of the force.

My invention is designed to utilize the whole force of the spring in available gripping friction, whereby I may obtain approximately twice as good a grip, other factors being equal, as with the old style clutch.

In accomplishing the above described result, I provide a driving or driven member having two friction surfaces, and two other members constituting a pair which are rotatable together and have relative longitudinal movement toward or from each other to grip or release the friction surfaces, and I mount a spring between the members of such pair operating to force them apart and thereby into engagement with the friction surfaces, the end thrust of the spring being entirely taken up by the movable members. Suitable means are provided to counteract the spring force to release the clutch when desired.

In the drawing, Figure 1 is a central section of a clutch embodying said invention, and Fig. 2 is an end view thereof, said view being sectioned in the plane indicated by line 2—2 of Fig. 1.

The two shafts to be connected are indicated by A and B, of which preferably the former is the driving and the latter the driven shaft.

A wheel D is fixed to shaft A, and on that side which is toward the other shaft there are two flanges $d$ and $d'$ whose inner surfaces are oppositely inclined conical surfaces concentric with said wheel. The wheel D may be of such size and weight that it will serve as a fly wheel. Two disks E and G are carried by the alined shaft B and are longitudinally movable with respect thereto, but are both compelled by reason of their connection with said shaft to rotate in unison with it.

Disk E is shown as having a long hub $e$ which has a tongue and groove connection with shaft B, which permits it to move longitudinally thereon. On the outer periphery of disk E is a conical flange $e'$ formed for engagement with the conical surface $d$,—and the flange $e'$ may have a facing $e^2$ of leather or other suitable material secured thereon. The disk G, as shown, has also a hub $g$ which embraces the hub $e$, and is movable thereon, there being a tongue and groove connection between said hubs which permits this movement but compels them to rotate together. At the outer periphery of disk G is a conical flange $g'$ shaped to fit the conical surface on flange $d'$; and flange $g'$ may have a facing $g^2$ of leather or other suitable material. Between the two disks E and G is a spring C (or springs C' as indicated by dotted lines) which exerts its force to thrust said disks apart, and thereby move them so that their conical flanges $e'$ and $g'$ will be forced into contact with the conical surfaces $d$ and $d'$ respectively.

To separate the friction surfaces, the disks "G" and "E" are moved toward each other against the action of the spring. This may be accomplished in a variety of ways. When the disk "G" is mounted on an elongated hub $e$ of the disk "E", as shown in the drawings, I may provide a collar $e^3$ on the end of the hub and suitable lever mechanism acting on the disk "G" and collar to force them in opposite directions. In the construction shown, this lever mechanism consists of the lever "K" having a yoke "k" extending around the hub "e" and pivoted to some fixed support (not shown), the yoke carrying rollers K³⁴ adapted to engage the collar and disk "G". As shown in Fig. 1 when the upper portion of the lever "K" is swung toward the right the roller K³ bears against the surface g⁵ on the disk "G" and the roller K⁴ against the collar e³ forcing such engaged surfaces apart and this moving the disks toward each other and releasing the clutch. It will be seen that as the collar e³ is adjustable on the hub "e" it may be set so that one of the rollers will engage before the other, thus releasing one clutch member in advance of the other. In such case, on reëngagement, one disk takes hold before the other causing the gripping forces to be progressively applied and increasing the ease of starting the driven member.

Having described my invention, I claim:

1. In a friction clutch, the combination of a pair of members having conical surfaces inclining in opposite directions, said members being rotatable together but movable toward and from each other, a spring tending to thrust said members into clutched position, a third member having two conical surfaces one of which encircles the other, rotatable together and adapted to be engaged by the respective members of the pair under the influence of the spring, and mechanism for moving the members of the pair in opposition to the spring to release the third member.

2. The combination of a member having an elongated hub, a second member surrounding said hub and slidable upon it, but compelled to rotate with it, spring means tending to change the proximity of said members to each other, a third member with which each of the members of the pair may coöperate, and lever mechanism having rollers, one of which is adapted to engage a shoulder carried by the hub and another of which is adapted to engage a surface movable with the other member to counteract the effect of the spring.

3. In a friction clutch, in combination, a pair of members rotatable together but movable toward and from each other, one of said members having an elongated hub projecting through the other member, a spring between said members tending to thrust them apart, a third member having surfaces, one of said surfaces being inside the other, adapted to be engaged by the respective members of the pair when so thrust apart, and mechanism acting on the hub and the member through which said hub projects and adapted to move such members in opposition to the spring to release the clutch.

4. The combination of a rotatable member having flanges, one of said flanges surrounding the other, the flanges having friction surfaces inclining oppositely, a shaft alined with the axis of said member, a conical member having an elongated hub loosely splined to said shaft, a second conical member loosely splined to said hub, said conical members last mentioned being both adapted to engage the two conical surfaces of the member first mentioned, a spring between the splined conical members tending to thrust them into clutched position, a shoulder on said elongated hub, and lever mechanism acting between said shoulder and the other conical member.

5. In a friction clutch, the combination of a rotatable wheel provided with two oppositely inclined conical friction surfaces, a shaft mounted in axial alinement with said wheel, a disk having a hub which embraces said shaft and has a tongue and groove connection therewith,—said disk being provided with a conical flange for engagement with one of the conical surfaces on said wheel, a second disk having a conical flange adapted for engagement with the other one of the conical friction surfaces on said wheel and provided with a hub which embraces the hub of the disk first named, and which has a tongue and groove connection therewith, a spring exerting its force to thrust said disks into clutched position, and a lever engaging, on opposite sides of its pivot, with surfaces rigidly fastened respectively to said disks.

6. In a friction clutch, a pair of oppositely facing members rotatable together but adapted to have their proximity to each other changed, spring means tending to cause such change, a third member having flanges, one of said flanges being outside the other, with which each member of the pair may coöperate when moved in opposite directions, and means for enabling the two members of the pair to successively engage said third member to make a progressive application of the clutching force.

7. In a friction clutch, in combination, a pair of oppositely facing conical members, rotatable together but movable toward and from each other, a spring between said members tending to thrust them into clutched position, a third member having flanges, one of said flanges surrounding the other with conical surfaces adapted to be engaged by the respective members of the pair under the influence of the spring, and means outside the rotating members for restraining the spring to enable the two members of the pair to successively engage said third member to make a progressive application of the clutch action.

8. The combination in a friction clutch, of a pair of members rotatable together but movable toward and from each other, one of said members having an elongated hub projecting through the other member, an adjustable collar on said hub, lever mechanism pivoted independently of either of said members and adapted to act progressively on said collar and the member slidable on the hub, and a third member having flanges, one of which encircles the other with surfaces adapted to be engaged by the respective members of the pair.

9. In a friction clutch, the combination of a rotatable member having an elongated hub, a second member surrounding said hub and slidable upon it, a collar screw-threaded on said hub, lever mechanism having rollers, one of which is adapted to engage said collar and the other the member slidable on the hub, and a third member having friction surfaces adapted to be engaged by the two members mentioned.

10. In a friction clutch, the combination of a pair of oppositely inclined conical clutch members rotatable together but movable toward and from each other, a third clutch member having a pair of flanges encircling each other with oppositely inclined engageable faces with which the two members first mentioned may respectively engage, and an operating lever pivoted outside of said clutch mechanism and acting in opposite directions on the two members first mentioned.

11. In a friction clutch, a shaft, a rotating member mounted thereon, flanges on said membe one surrounding the other, the inner flange having its inner surface of conical shape, a frictional member mounted upon the outer flange, said frictional member being formed with a conical surface sloping in opposite direction to said first mentioned conical surface, a second shaft, members mounted to rotate therewith but capable of longitudinal movement thereon and with respect to each other, said members each having a conical surface to engage with the surfaces on the first mentioned rotatable members, and means for causing said surfaces to engage and disengage.

12. In a friction clutch, a rotating member, flanges on said member, one surrounding the other, the inner flange having its inner surface of conical shape, a frictional member removably mounted upon the outer flange, said frictional member being formed with a conical surface sloping in opposite direction to said first mentioned conical surface, two members extending one into the other and mounted to rotate together but capable of longitudinal movement with respect to each other, said members each having a conical surface to engage with the surfaces on the first mentioned rotatable member, and means for causing such driving and driven surfaces to normally be in contact, and other means for releasing such contact.

13. In a friction clutch, a shaft, a rotatable member having flanges thereon one flange surrounding the other, a second shaft, two members rotatable with said shaft but longitudinally movable with respect to said shaft and to each other, means for holding said members on the second mentioned shaft normally in engagement with the members on the first mentioned shaft, and regulable means for causing the two members on the second shaft to engage the members on the first shaft at different times.

14. In a friction clutch, a rotatable member having concentric oppositely inclined friction surfaces, one surrounding the other, a pair of conical friction members rotatable together but longitudinally movable with respect to each other, said friction members extending one into the other and being adapted to engage such inclined surfaces respectively.

15. In a friction clutch, a rotatable member having concentric oppositely inclined friction surfaces, one surrounding the other, a pair of conical friction members rotatable together but longitudinally movable with respect to each other, said friction members extending one into the other and being adapted to engage such inclined surfaces respectively, a spring between said members tending to force them apart to set them, and means for independently releasing the members to the action of the spring.

16. In a friction clutch, a clutch member having a hub, a second clutch member slidably mounted upon said hub, said members telescoping one with the other, a third clutch member having friction surfaces adapted to be engaged by the clutch members, a spring to hold said members in clutched relation, and a lever pivoted outside the clutch mechanism having rollers and adapted to engage the first and second clutch members to release the clutch.

17. In a friction clutch, in combination, a pair of telescoping clutch members having oppositely inclining conical friction peripheries, a third clutch member having two conical friction surfaces which said peripheries are adapted to engage respectively, said friction surfaces one surrounding the other and the inner surface being on a member projecting between said two conical peripheries.

18. In a friction clutch, in combination, a pair of telescoping clutch members having oppositely inclining conical friction peripheries, a third clutch member having two conical friction surfaces which said peripheries are adapted to engage respectively, said friction surfaces one surrounding the other and the inner surface being on a member projecting between said two conical peripheries, and the outer friction surface being carried by an annular member removably held on said third member.

19. In a friction clutch, in combination, a pair of telescoping clutch members having oppositely inclining conical friction peripheries, a third clutch member having two conical friction surfaces which said peripheries are adapted to engage respectively, said friction surfaces one surrounding the other and the inner surface being on a member projecting between said two conical peripheries, a spring between said pair of telescoping members tending to force them apart and into engagement with said friction surfaces, and mechanism exterior of said members for forcing said members in the opposite direction.

In testimony whereof, I hereunto affix my signature in the presence of two witnesses.

VAN ZANDT MUMFORD MOORE.

Witnesses:
E. L. THURSTON,
E. B. GILCHRIST.